July 17, 1934.  R. A. BEVIS  1,966,536
GARDEN IMPLEMENT
Filed Aug. 15, 1933
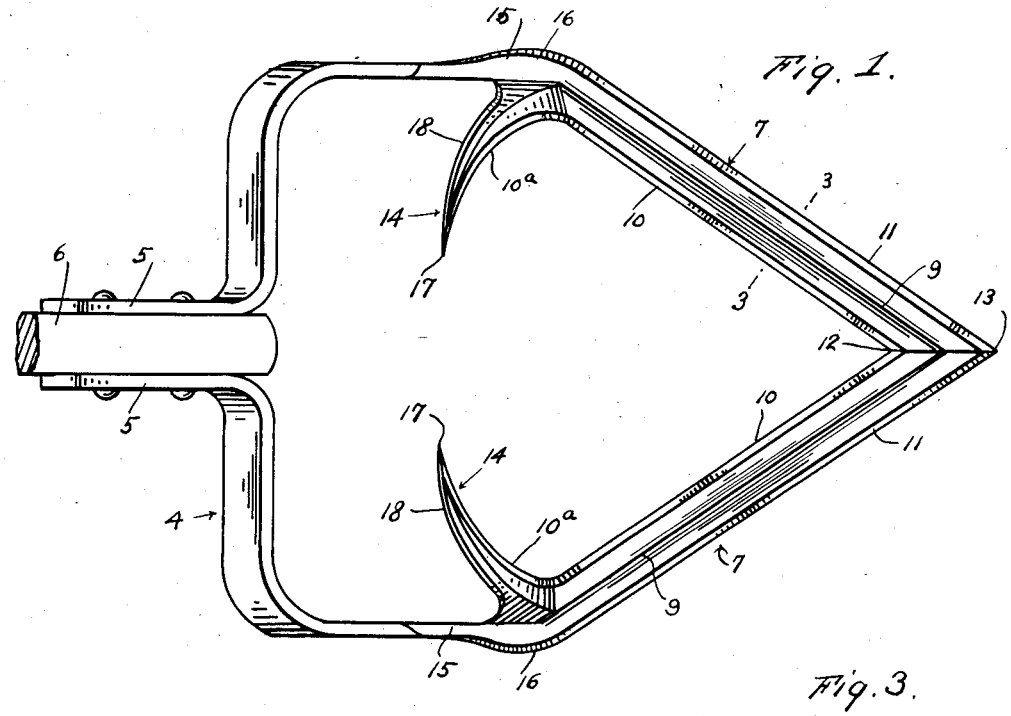
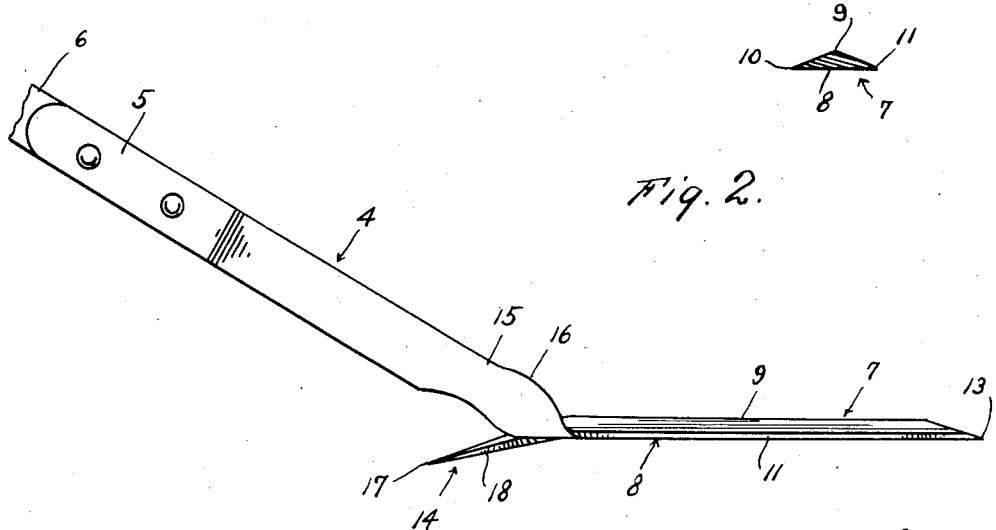
Inventor
R. A. Bevis
By Clarence A. O'Brien
Attorney Patented July 17, 1934

1,966,536

UNITED STATES PATENT OFFICE 1,966,536

GARDEN IMPLEMENT

Richard A. Bevis, McCrory, Ark.

Application August 15, 1933, Serial No. 685,291

4 Claims. (Cl. 97—68)

This invention relates to an especially designed manually actuated implement usable to good advantage in garden and truck farming.

Reflecting convertible and diversified characteristics the improved implement may be defined as one destined to fulfill the many needs of tools of this general classification in that it possesses certain structural refinements enabling it to serve as a hand plow, a soil and clod pulverizer, a leveling and conditioning hoe, as a harrow and for many other purposes for which it is aptly fitted.

In perfecting the preferred embodiment of the invention I have evolved and produced an implement whose features of accommodation and adaptation and the special purposes for which it is intended transcend those of familiar tools and implements heretofore patented and marketed to accomplish similar tasks.

As will be observed from the following description and the illustrative drawing measures have been taken to provide a simple and economical one-piece steel frame of a special type and style which will satisfactorily fulfill the needs and requirements due to the special selection and coordination of features and the continuity of cooperation depending on the particular job to be accomplished at the time.

Other features and advantages and results will become more readily apparent from the following description and drawing.

In the drawing:

Figure 1 is a top plan view of an implement constructed in accordance with the principles of the present inventive conception.

Figure 2 is a side or edge elevational view thereof.

Figure 3 is a cross section on the plane of the line 3—3 of Figure 1.

As before indicated the principal part of the invention may be broadly referred to as a metallic frame and this is preferably constructed from a special grade of steel possessing requisite strength, weight and proportions. The frame may be said to embody a substantially U-shaped yoke 4 whose separated end portions 5 constitute adapter elements for attachment of the adjacent end of the inclined handle 6. Incidentally the handle may be of any appropriate shape and proportion. The frontal portion of the frame may be described as a V-shaped cutter and soil conditioner. The companion converging portions thereof are distinguished by the numerals 7, these coming together at their forward end portions in converging relationship. The bottom surfaces thereof are substantially flat as indicated at A in Figure 3 and in cross sectional shape these members are of general triangular shape. The apex portion 9 constitutes a centralized rib and the edge portions are tapered and sharpened to provide inner and outer knife like cutting edges 10 and 11 respectively. The converging ends of the cutting edges 10 merge together as indicated at 11 to provide a weed and plant cutting pocket which is active as the implement is pulled or drawn rearwardly that is in the direction toward the user. The converging ends of the cutting edges 11 merge together in defining a soil or ground penetrating point 13 usable for digging and underplowing purposes.

Formed integral with the frame and projecting into the limits thereof are duplicate companion curved and pointed elements which may be distinguished as pulverizing blades 14. These are located at the juncture of the yoke and V-shaped cutter. Incidentally, this transformation between the cutter and yoke is obtained by twisting the metal to form what may be described as jointing webs or flanges 15. It will be observed that the cutting edges 11 merge into the flanges, the upper edges 16 of these flanges being somewhat more flattened than rounded to serve as weed lifters as the implement is jiggered or reciprocated back and forth in a well known manner. The blades 14 terminate in fine points 17 which may be used somewhat as harrow teeth. Moreover the opposite edges are formed into knife like cutting edges distinguishable by the numerals 10a and 18 respectively. The edges 10a actually constitute a continuation of the aforesaid inner cutting edges 10. These blades 14 are deflected laterally and downward so as to incline to a plane below the flat bottom surfaces 8 of the V-shaped cutter. This special coordination between the blades and cutting edges 10 affords a continuation of operation for effective weed cutting, pulverizing and cultivating operations not heretofore attainable with similar types of implements.

It will be evident to those skilled in the art to which the invention relates that the implement may serve as a simple plow for earth digging and lifting purposes. It constitutes an excellent tool for pulverizing land and making small seed beds for gardens and truck patches. It is also extremely handy for opening and covering seed drills. Then too, it may be employed in the capacity of a hoe, as a cultivating device, a weed cutter, and even as a scythe. In other words by lifting it bodily and swinging it through a part circle, somewhat in the same manner as an ordinary scythe it serves in a practical way for disposing of tall grass, weeds and the like. The extremely sharp point 13 which distinguishes the V-shaped cutter will penetrate any character of soil for digging and planting purposes. It can be actuated with an expenditure of a minimum of energy. Moreover it is a more or less continuously operating tool in that it performs a service as it is pushed or shoved forward and as it is pulled or dragged backward over the surface. The backward stroke enables the inner cutting edges 10 to come into play and facilitates operation of the weed concentrating and cutting pocket 12. At the same time the cutting edges 18 of the blades 14 perform during the forward stroke the cutting edges 10a cooperate with the outer cutting edges 11 and the point 13 in plowing and weed cutting in a highly efficient and satisfactory manner.

A careful consideration of the foregoing description in conjunction with the illustrative drawing will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

1. In a tool of the class described, a handle, a frame attached to said handle and including an attaching yoke, a substantially V-shaped cutter and webs joining the arms of the yoke to the rear diverging end portions of the V-shaped cutter, said V-shaped cutter being flat on its bottom and substantially triangular in cross sectional shape, the longitudinal edge portions thereof being shaped to define inner and outer cutting edges, the converging portions of the inner cutting edges defining a V-shaped weed severing pocket, and the converging ends of the outer cutting edges constituting an earth penetrating point, and a pair of companion oppositely disposed and duplicate pulverizing blades formed integral with the frame and joined thereto at the juncture of the yoke and inner end portions of said V-shaped cutter.

2. An implement of the class described comprising a handle and a frame, said frame including a V-shaped cutter whose portions are substantially triangular in cross sectional shape to define a flat bottom and a centralized apex rib, the inner and outer longitudinal edges of the portions of said V-shaped cutter being sharpened to provide knife-like cutting edges, a pair of inturned oppositely disposed longitudinally curved pulverizing blades attached to the inner end portion of the V-shaped cutter and terminating in cutting points and having their opposite longitudinal edges sharpened to provide additional cutting edges, the forward cutting edges of said blade constituting a continuation of the inner cutting edges of the V-shaped cutter.

3. An implement of the class described comprising a handle and a frame, said frame including a V-shaped cutter whose portions are substantially triangular in cross sectional shape to define a flat bottom and a centralized apex rib, the inner and outer longitudinal edges of the portions of said V-shaped cutter being sharpened to provide knife-like cutting edges, a pair of inturned oppositely disposed longitudinally curved pulverizing blades attached to the inner end portion of the V-shaped cutter and terminating in cutting points and having their opposite longitudinal edges sharpened to provide additional cutting edges, the forward cutting edges of said blade constituting a continuation of the inner cutting edges of the V-shaped cutter, said blade being inclined rearwardly and downwardly to permit the pointed end to occupy a plane below the flat bottom of the V-shaped cutter.

4. In a tool of the class described, a frame including a yoke, a substantially V-shaped cutter and webs joining the arms of the yoke to the rear diverging end portions of the V-shaped cutter, and a pair of companion oppositely disposed and duplicate pulverizing blades formed integrally with the frame and joined thereto at the juncture of the yoke and the end portions of said V-shaped cutter.

RICHARD A. BEVIS.